United States Patent
Ko et al.

(10) Patent No.: US 11,853,901 B2
(45) Date of Patent: Dec. 26, 2023

(54) LEARNING METHOD OF AI MODEL AND ELECTRONIC APPARATUS

(71) Applicant: SAMSUNG ELECTRONICS CO., LTD., Suwon-si (KR)

(72) Inventors: Kwangwon Ko, Suwon-si (KR); Jongchul Park, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 562 days.

(21) Appl. No.: 16/938,593

(22) Filed: Jul. 24, 2020

(65) Prior Publication Data

US 2021/0027172 A1 Jan. 28, 2021

(30) Foreign Application Priority Data

Jul. 26, 2019 (KR) .................. 10-2019-0090963

(51) Int. Cl.
*G06N 3/02* (2006.01)
*G06N 5/02* (2023.01)

(52) U.S. Cl.
CPC ............ *G06N 5/02* (2013.01); *G06N 3/02* (2013.01)

(58) Field of Classification Search
CPC ............ G06N 5/02; G06N 3/02; G06N 3/063; G06N 3/08; G06Q 50/10
See application file for complete search history.

(56) References Cited

U.S. PATENT DOCUMENTS

| 7,725,192 | B2 | 5/2010 | Eskandar et al. |
| 8,856,936 | B2 | 10/2014 | Datta Ray et al. |
| 9,064,017 | B2 | 6/2015 | Bilic et al. |
| 9,471,884 | B2 | 10/2016 | Hamann et al. |
| 9,536,269 | B2 | 1/2017 | Chang et al. |
| 9,679,258 | B2 | 6/2017 | Mnih et al. |

(Continued)

FOREIGN PATENT DOCUMENTS

| CN | 108563755 A | 9/2018 |
| CN | 109885756 A | 6/2019 |

(Continued)

OTHER PUBLICATIONS

Ali Elkahky et al., A Multi-View Deep Learning Approach for Cross Domain User Modeling in Recommendation Systems, May 2015, ACM, pp. 278-288. (Year: 2015).*

(Continued)

*Primary Examiner* — Phenuel S Salomon
(74) *Attorney, Agent, or Firm* — Sughrue Mion, PLLC

(57) ABSTRACT

Disclosed are a training method of an artificial intelligence (AI) model configured to provide information identifying a recommendation item and a recommended user, and an electronic apparatus for training an AI model. The training method includes obtaining user data and item data; generating a first semantic vector at a first time interval based on the user data; generating a second semantic vector at the first time interval based on the item data; generating a vector that represents a relevance between the first semantic vector and the second semantic vector at the first time interval; storing data corresponding to the generated vector, the first semantic vector, and the second semantic vector; and obtaining an updated weight for the first AI model by training the first AI model based on the stored data.

4 Claims, 12 Drawing Sheets

(56) References Cited

U.S. PATENT DOCUMENTS

| | | |
|---|---|---|
| 9,754,221 B1 | 9/2017 | Nagaraja |
| 9,760,690 B1 | 9/2017 | Petkov et al. |
| 9,792,397 B1 | 10/2017 | Nagaraja |
| 9,892,223 B1 | 2/2018 | Nagaraja |
| 9,934,567 B2 | 4/2018 | Podilchuk et al. |
| 9,942,085 B2 | 4/2018 | Tsagkaris et al. |
| 10,032,281 B1 | 7/2018 | Ghesu et al. |
| 10,049,301 B2 | 8/2018 | Kluckner et al. |
| 10,162,844 B1 | 12/2018 | McCord et al. |
| 10,204,166 B2* | 2/2019 | Petrescu ............ G06F 16/24578 |
| 10,210,418 B2 | 2/2019 | Liu et al. |
| 10,361,802 B1* | 7/2019 | Hoffberg-Borghesani ................... G06F 3/00 |
| 10,686,672 B2 | 6/2020 | Georgios et al. |
| 11,080,591 B2 | 8/2021 | van den Oord et al. |
| 2003/0208399 A1* | 11/2003 | Basak .................... G06Q 30/02 705/14.67 |
| 2013/0290339 A1* | 10/2013 | LuVogt ............... G06F 16/9535 707/E17.089 |
| 2015/0262066 A1 | 9/2015 | Li et al. |
| 2015/0310754 A1 | 10/2015 | Bilic et al. |
| 2016/0148516 A1 | 5/2016 | Senn et al. |
| 2016/0232445 A1 | 8/2016 | Srinivasan et al. |
| 2017/0024643 A1 | 1/2017 | Lillicrap et al. |
| 2017/0032245 A1 | 2/2017 | Osband et al. |
| 2017/0032282 A1 | 2/2017 | Senoo |
| 2017/0071671 A1 | 3/2017 | Neumann et al. |
| 2017/0076201 A1 | 3/2017 | van Hasselt et al. |
| 2017/0083929 A1 | 3/2017 | Bates et al. |
| 2017/0091319 A1* | 3/2017 | Legrand ............. G06F 16/3346 |
| 2017/0140270 A1 | 5/2017 | Mnih et al. |
| 2017/0147743 A1 | 5/2017 | Bixby et al. |
| 2017/0154261 A1 | 6/2017 | Sunehag |
| 2017/0165481 A1 | 6/2017 | Menon |
| 2017/0169313 A1 | 6/2017 | Choi et al. |
| 2017/0185670 A1 | 6/2017 | Dua et al. |
| 2017/0185894 A1* | 6/2017 | Volkovs ................... G06N 3/08 |
| 2017/0200266 A1 | 7/2017 | Podilchuk et al. |
| 2017/0213127 A1 | 7/2017 | Duncan |
| 2017/0217102 A1 | 8/2017 | Mansi et al. |
| 2017/0235824 A1 | 8/2017 | Liu |
| 2017/0278018 A1 | 9/2017 | Mnih et al. |
| 2017/0293859 A1 | 10/2017 | Gusev et al. |
| 2017/0293860 A1 | 10/2017 | Fyffe |
| 2017/0308656 A1 | 10/2017 | Petkov et al. |
| 2017/0330077 A1 | 11/2017 | Williams et al. |
| 2017/0337478 A1 | 11/2017 | Sarikaya et al. |
| 2017/0337682 A1 | 11/2017 | Liao et al. |
| 2017/0366425 A1 | 12/2017 | Latapie et al. |
| 2018/0018562 A1 | 1/2018 | Jung |
| 2018/0018757 A1 | 1/2018 | Suzuki |
| 2018/0075137 A1 | 3/2018 | Lifar et al. |
| 2018/0096478 A1 | 4/2018 | Zhang et al. |
| 2018/0129970 A1 | 5/2018 | Gottschlich et al. |
| 2018/0129974 A1 | 5/2018 | Giering et al. |
| 2018/0137550 A1 | 5/2018 | Choi et al. |
| 2018/0144244 A1 | 5/2018 | Masoud et al. |
| 2018/0174038 A1 | 6/2018 | Jiang et al. |
| 2018/0218433 A1 | 8/2018 | Penner et al. |
| 2018/0220061 A1 | 8/2018 | Wang et al. |
| 2018/0233222 A1 | 8/2018 | Daley et al. |
| 2018/0243800 A1 | 8/2018 | Kumar et al. |
| 2018/0260691 A1 | 9/2018 | Nagaraja |
| 2018/0260700 A1* | 9/2018 | Nagaraja ................. G06N 5/043 |
| 2018/0260708 A1 | 9/2018 | Mnih et al. |
| 2018/0286046 A1 | 10/2018 | Battle et al. |
| 2018/0286409 A1 | 10/2018 | Baughman et al. |
| 2018/0293498 A1 | 10/2018 | Campos et al. |
| 2018/0293517 A1 | 10/2018 | Browne et al. |
| 2018/0293814 A1 | 10/2018 | Gilbert et al. |
| 2018/0300400 A1 | 10/2018 | Paulus |
| 2018/0322254 A1 | 11/2018 | Smurro |
| 2018/0322637 A1 | 11/2018 | Ghesu et al. |
| 2018/0342004 A1* | 11/2018 | Yom-Tov ................ G06N 7/005 |
| 2018/0349535 A1 | 12/2018 | Bhosale et al. |
| 2018/0349538 A1 | 12/2018 | Bhosale et al. |
| 2018/0351816 A1 | 12/2018 | Li |
| 2018/0357552 A1 | 12/2018 | Campos et al. |
| 2018/0366020 A1 | 12/2018 | Bilic et al. |
| 2018/0373982 A1 | 12/2018 | Salakhutdinov et al. |
| 2018/0374138 A1 | 12/2018 | Mohamed |
| 2019/0004518 A1 | 1/2019 | Zhou et al. |
| 2019/0014488 A1 | 1/2019 | Tan et al. |
| 2019/0019080 A1 | 1/2019 | Claessens et al. |
| 2019/0019286 A1 | 1/2019 | Passerini et al. |
| 2019/0034581 A1 | 1/2019 | Aliper et al. |
| 2019/0042943 A1 | 2/2019 | Dasgupta et al. |
| 2019/0042979 A1 | 2/2019 | Devulapalli et al. |
| 2019/0047149 A1 | 2/2019 | Wouhaybi et al. |
| 2019/0050729 A1 | 2/2019 | Lakshmanan et al. |
| 2019/0130285 A1* | 5/2019 | Snyder ............... G06Q 30/0641 |
| 2019/0279231 A1* | 9/2019 | Ning .................. G06Q 30/0202 |
| 2020/0159860 A1* | 5/2020 | Du ...................... G06F 16/3325 |

FOREIGN PATENT DOCUMENTS

| | | |
|---|---|---|
| EP | 3326114 | 2/2017 |
| EP | 3142033 A1 | 3/2017 |
| EP | 3360085 | 5/2017 |
| EP | 3384435 | 6/2017 |
| EP | 3398116 | 7/2017 |
| EP | 3430576 | 9/2017 |
| EP | 3246875 A2 | 11/2017 |
| EP | 3279820 A1 | 2/2018 |
| EP | 3319016 A1 | 5/2018 |
| EP | 3399501 A1 | 11/2018 |
| EP | 3295611 B1 | 12/2018 |
| EP | 3428925 A1 | 1/2019 |
| JP | 2014-228918 A | 12/2014 |
| KR | 10-1804170 B1 | 12/2017 |
| KR | 1020180009408 A | 1/2018 |
| KR | 1020180121466 A | 11/2018 |
| KR | 1020190015164 A | 2/2019 |
| KR | 10-1997222 B1 | 7/2019 |
| KR | 10-2061331 B1 | 12/2019 |
| WO | 2017004626 A1 | 1/2017 |
| WO | 2017019555 A1 | 2/2017 |
| WO | 2017083772 A1 | 5/2017 |
| WO | 2017096079 A1 | 6/2017 |
| WO | 2017114810 A1 | 7/2017 |
| WO | 2017114810 A9 | 7/2017 |
| WO | 2017158058 A1 | 9/2017 |
| WO | 2017177128 A1 | 10/2017 |
| WO | 2017196689 A1 | 11/2017 |
| WO | 2017219890 A1 | 12/2017 |
| WO | 2018011742 A1 | 1/2018 |
| WO | 2018053187 A1 | 3/2018 |
| WO | 2018113260 A1 | 6/2018 |
| WO | 2018139993 A1 | 8/2018 |
| WO | 2018140332 A1 | 8/2018 |
| WO | 2018188981 A1 | 10/2018 |
| WO | 2018200845 A1 | 11/2018 |
| WO | 2018236674 A1 | 12/2018 |
| WO | 2019007388 A1 | 1/2019 |
| WO | 2019018780 A1 | 1/2019 |

OTHER PUBLICATIONS

Elkahky, A., et al., "A Multi-View Deep Learning Approach for Cross Domain User Modeling in Recommendation Systems", WWWW '15: Proceedings of the 24th International Conference on World Wide Web, May 2015, 11 pages.

Communication dated Oct. 30, 2020, issued by the International Searching Authority in counterpart International Application No. PCT/KR2020/009742 (PCT/ISA/210 and PCT/ISA/237).

Communication dated May 9, 2022 issued by the European Patent Office in counterpart European Application No. 20846215.0.

Shipra Narang et al., "Deep Content-Collaborative Recommender System (DCCRS)", International Conference on Advances in Computing, Communication Control and Networking (ICACCCN), IEEE,

(56) References Cited

OTHER PUBLICATIONS

2018, DOI: 10.1109/ICACCCN.2018.8748600, XP033571022, 7 pages total.

* cited by examiner

LEARNING METHOD OF AI MODEL AND ELECTRONIC APPARATUS

CROSS-REFERENCE TO RELATED APPLICATION(S)

This application is based on and claims priority under 35 U.S.C. § 119 to Korean Patent Application No. 10-2019-0090963, filed on Jul. 26, 2019, in the Korean Intellectual Property Office, the disclosure of which is incorporated by reference herein in its entirety.

BACKGROUND

1. Field

The disclosure relates to an electronic apparatus and a learning method of an artificial intelligence (AI) model and, more particularly, to a learning method of an AI model providing a recommendation item and a recommended user based on a user's interaction and an electronic apparatus for learning the AI model.

2. Description of Related Art

In recent years, AI systems have been used in various fields. An AI system is a system in which a machine learns, judges, and iteratively improves analysis and decision making, unlike an existing rule-based smart system. As the use of AI systems increases, for example, an accuracy, a recognition rate and understanding or anticipation of a user's taste may be correspondingly increased. As such, existing rule-based smart systems are gradually being replaced by deep learning-based AI systems.

AI technology is composed of machine learning, for example deep learning, and elementary technologies that utilize machine learning.

Machine learning is an algorithmic technology that is capable of classifying or learning characteristics of input data. Element technology is a technology that simulates functions, such as recognition and judgment of a human brain, using machine learning algorithms, such as deep learning. Machine learning is composed of technical fields such as linguistic understanding, visual understanding, reasoning, prediction, knowledge representation, motion control, or the like.

Various fields implementing AI technology may include the following. Linguistic understanding is a technology for recognizing, applying, and/or processing human language or characters and includes natural language processing, machine translation, dialogue system, question and answer, speech recognition or synthesis, and the like. Visual understanding is a technique for recognizing and processing objects as human vision, including object recognition, object tracking, image search, human recognition, scene understanding, spatial understanding, image enhancement, and the like. Inference prediction is a technique for judging and logically inferring and predicting information, including knowledge-based and probability-based inference, optimization prediction, preference-based planning, recommendation, or the like. Knowledge representation is a technology for automating human experience information into knowledge data, including knowledge building (data generation or classification), knowledge management (data utilization), or the like. Motion control is a technique for controlling the autonomous running of the vehicle and the motion of the robot, including motion control (navigation, collision, driving), operation control (behavior control), or the like.

Recently, a recommendation item is provided to a user based on user interaction. Specifically, a method for semantically classifying a user based on atypical data, such as log and review, left by online activities of a user, and recommending an item with a change pattern of semantic classification is used.

In the related art, a user and an item are mapped statically on the basis of a past behavior. For example, an item was recommended based only on content viewed in the past, an item specification purchased in the past, and the like. Accordingly, there is a limit in that recommendation is made based solely on past behavior and thus, a user's current actual preferences, tendencies, or the like, may not be considered.

SUMMARY

Additional aspects will be set forth in part in the description which follows and, in part, will be apparent from the description, or may be learned by practice of the presented embodiments.

Aspects of the disclosure are to address at least the above-mentioned problems and/or disadvantages and to provide at least the advantages described below. Accordingly, an aspect of the disclosure is to provide a user with an optimal action by executing semantic classification for a plurality of users and items based on on-line user data, and training (or learning) the AI model.

According to an aspect of the disclosure, training method of an artificial intelligence (AI) model configured to provide information identifying a recommendation item and a recommended user may include obtaining user data and item data; generating a first semantic vector at a first time interval based on the user data; generating a second semantic vector at the first time interval based on the item data; generating a vector that represents a relevance between the first semantic vector and the second semantic vector at the first time interval; storing data corresponding to the generated vector, the first semantic vector, and the second semantic vector; and obtaining an updated weight for the first AI model by training the first AI model based on the stored data.

According to an aspect of the disclosure, an electronic apparatus for training an artificial intelligence (AI) model configured to provide information identifying a recommendation item and a recommended user may include a memory configured to store at least one instruction; and a processor configured to execute the at least one instruction to obtain user data and item data, generate a first semantic vector at a first time interval based on the user data, generate a second semantic vector at the first time interval based on the item data, generate a vector representing a relevance of the first semantic vector and the second semantic vector at the first time interval, store data corresponding to the generated vector, first semantic vector, and the second semantic vector in the memory, and obtain a updated weight for the first AI model, by training a first artificial intelligence (AI) model based on the data stored in the memory.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1A:
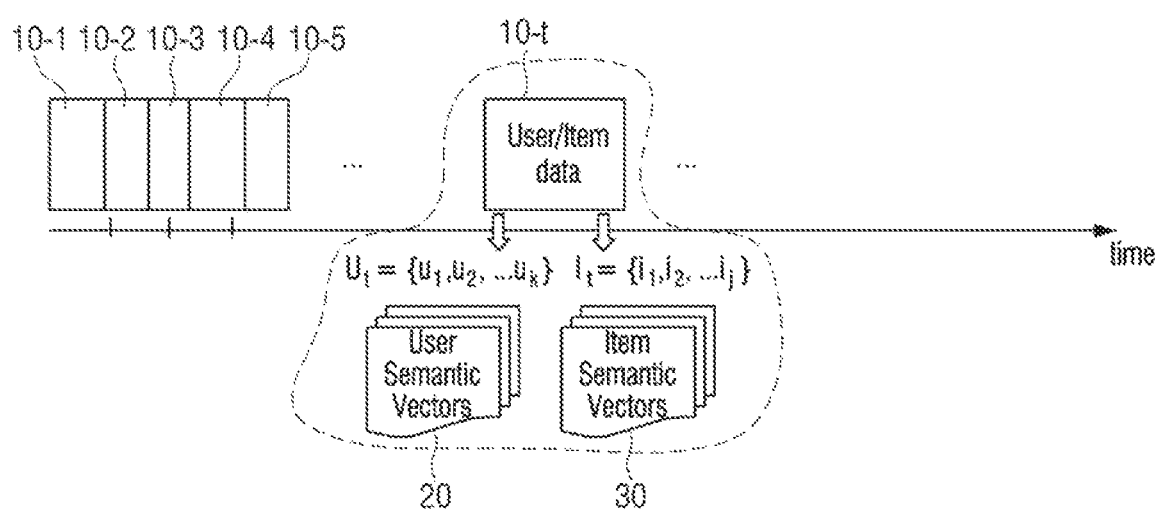
FIG. 1A is a view illustrating a method for generating a semantic vector for a user and an item in consideration of a temporal change.

Hereinafter, embodiments of the disclosure will be described with reference to the accompanying drawings. However, this disclosure is not intended to limit the embodiments described herein but includes various modifications, equivalents, and/or alternatives. In the context of the description of the drawings, like reference numerals may be used for similar components.

In this document, the expressions "have," "may have," "including," or "may include" may be used to denote the presence of a feature (e.g., a numerical value, a function, an operation), and do not exclude the presence of additional features.

In this document, the expressions "A or B," "at least one of A and/or B," or "one or more of A and/or B," and the like include all possible combinations of the listed items. For example, "A or B," "at least one of A and B," or "at least one of A or B" includes (1) at least one A, (2) at least one B, or (3) at least one A and at least one B together.

In the description, the terms "first," "second," and so forth are used to describe diverse elements regardless of their order and/or importance, and to discriminate one element from other elements, but are not limited to the corresponding elements.

It is to be understood that an element (e.g., a first element) that is "operatively or communicatively coupled with/to" another element (e.g., a second element) may be directly connected to the other element or may be connected via another element (e.g., a third element). Alternatively, when an element (e.g., a first element) is "directly connected" or "directly accessed" to another element (e.g., a second element), it can be understood that there is no other element (e.g., a third element) between the other elements.

Herein, the expression "configured to" can be used interchangeably with, for example, "suitable for," "having the capacity to," "designed to," "adapted to," "made to," or "capable of" The expression "configured to" does not necessarily mean "specifically designed to" in a hardware sense. Instead, under some circumstances, "a device configured to" may indicate that such a device can perform an action along with another device or part. For example, the expression "a processor configured to perform A, B, and C" may indicate an exclusive processor (e.g., an embedded processor) to perform the corresponding action, or a generic-purpose processor (e.g., a central processing unit (CPU) or application processor (AP)) that can perform the corresponding actions by executing one or more software programs stored in the memory device.

An electronic apparatus in accordance with various embodiments of the disclosure may be implemented as at least one server, but this is merely exemplary, and may be implemented as a user terminal device or a home appliance product. The electronic apparatus may include, for example, smartphones, tablet personal computers (PCs), mobile phones, video telephones, electronic book readers, desktop PCs, laptop PCs, netbook computers, workstations, servers, a personal digital assistance (PDA), a portable multimedia player (PMP), an MP3 player, a medical device, a camera, or a wearable device. The wearable device may include any one or any combination of the accessory type (e.g., as a watch, a ring, a bracelet, a bracelet, a necklace, a pair of glasses, a contact lens or a head-mounted-device (HMD)); a fabric or a garment-embedded type (e.g., an electronic clothing), a skin-attached type (e.g., a skin pad or a tattoo); or a bio-implantable circuit.

In this disclosure, the term "user" may refer to a person who uses an electronic apparatus or an apparatus (e.g., an artificial intelligence electronic apparatus) that uses an electronic apparatus.

The AI model according to the disclosure may be composed of a plurality of neural network layers. Each layer has a plurality of weight values, and performs a layer operation through calculation of a previous layer and an operation of a plurality of weights. Examples of neural networks may include, but are not limited to, a convolutional neural network (CNN), a deep neural network (DNN), a recurrent neural network (RNN), a Restricted Boltzmann Machine Task (RBM), a deep belief network (DBN), a bidirectional deep neural network (BRDNN), and deep Q-networks, and the neural network in the disclosure is not limited to the above-described example except when specified.

The learning algorithm is a method for training a predetermined target device (e.g., a robot) using a plurality of learning data to make a determination or prediction of a predetermined target device by itself. Examples of learning algorithms include supervised learning, unsupervised learning, semi-supervised learning, or reinforcement learning, and the learning algorithm in the disclosure is not limited to the examples described above except when specified.

FIG. 1A is a view illustrating a method for generating a semantic vector for a user and an item in consideration of a temporal change.

An electronic apparatus 100 may obtain user/item data 10-1 through 10-t. That is, data for the user's behavior may be obtained when the user's behavior is sensed on-line, and data for the updated item may be obtained when the information about the item is updated. User data may refer to a log record of a particular user on-line, and may include, for example, a user's Internet access record, an item purchase record, a social media activity record, a review record about an item, or the like. Item data may refer to information about a particular item on the Internet, and may include, for example, descriptive information about a particular item, advertising information, or the like. According to one embodiment, the electronic apparatus 100 may obtain user data on-line, or may only obtain specific user data corresponding to a predetermined range or condition. The predetermined range may be age, gender, nationality, or the like. The electronic apparatus 100 may obtain data about an item on an online or obtain only data corresponding to a particular item corresponding to a preset condition or a preset category.

The electronic apparatus 100 may generate a semantic vector at each first time interval based on the obtained user/item data 10-1 to 10-t.

Semantic vectors 20 and 30 may refer to a set (first semantic vector 20) that expresses user data as a vector based on user data and item data obtained for a predetermined time, and a set (second semantic vector 30) representing the item data as a vector. The electronic apparatus 100 may represent the data for the user and item data as a vector, calculate the distance relationship between them, and calculate the relevance R between the user and the particular item. The relevance between the user and the particular item may be obtained through a cosine distance between each element of the first semantic vector and each element of the second semantic vector. For example, relevance R (u1, i3) between the a first user u1 and a third item i3 may be represented as cosine $$(u1, i3) = \frac{u_1^T i_3}{\|u_1\| \cdot \|i_3\|}.$$

The higher the relevance between a user and a particular item, the higher the purchasing possibility of a particular item by the user.

Referring to FIG. 1A, $U_t$ illustrates the first semantic vector 20 generated on the basis of user data among user/item data 10-t obtained during a second interval at a t time, and a first semantic vector ($U_t$) 20 represents a semantic vector for the behavior of users. $U_1$ represents one element of the first semantic vector ($U_t$) 20 representing the data for the first user at the t time as a vector. Specifically, the first semantic vector ($U_t$) 20 related to the user corresponding to the t time is generated every first time interval based on the user data obtained during the second time interval that is greater than the first time. The $U_t$ may refer to the first semantic vector 20 generated at the time t based on the user data obtained by obtaining the user data for the first to $k^{th}$ users from a time before the second time from the t time to t time. The first semantic vector 20 and the second semantic vector 30 corresponding to the first time may be generated based on the user/item data 10-1 obtained during the first time at a second time interval, the first semantic vector 20 and the second semantic vector 30 corresponding to the second time may be generated based on the user/item data 10-2 obtained at the second time that is the first time interval after the first time, and the first semantic vector 20 and the second semantic vector 30 may be generated at every first time interval.

For example, if the first time is set to one day and the second time is set to three days, if the current time t is May 24, first semantic vector $U_t$ for May 24 may be generated on the basis of the user data obtained for three days from May 21 to May 24, and then the first semantic vector $U_{t+1}$ on May 25, which is one day after that is the first time interval, may be generated based on the user data obtained for three days from May 22 to May 25. That is, when the first time is set to one day and the second time is set to three days, the first semantic vector is generated at a one-day interval and is generated based on the user data for the previous three days from the present. The first time is not limited to the example described above, and may be a second unit or year unit.

The recently generated first semantic vector is generated in consideration of data about a recent behavior of a user and thus, the data about the old behavior of a user gradually disappears from the semantic vector. In addition, the magnitude of the second time may be adjusted to determine whether to respond sensitively to the user's recent behavior. That is, when the second time is set to ten days instead of three days, the first semantic vector 20 is generated based on the user data of ten days, so that the electronic apparatus 100 may respond to the user's recent behavior more insensitively as compared to a case when the second time is set to three days. Referring to FIG. 1A, the $I_t$ represents the second semantic vector 30 generated based on the item data among the user/item data 10-t obtained during the second interval at the t time, and the second semantic vector ($I_t$) 30 represents the semantic vector for the particular item. Here, $i_t$ represents one element of the second semantic vector 30 representing the data for the first item at the t time as a vector, and $i_j$ represents one element of the second semantic vector 30 representing the data for the j item as a vector. Specifically, the second semantic vector ($I_t$) 30 related to the item corresponding to the t time is generated every first time interval based on the item data obtained during the second time interval larger than the first time interval reference. That is, $I_t$ represents a second semantic vector generated based on item data obtained by obtaining data for the first item to the $j^{th}$ item from a time before the second time from the t time to the t time. The electronic apparatus 100 may generate the first semantic vector 20 and the second semantic vector 30 every first interval based on the user/item data 10-1 to 10-t obtained during the second time interval.

Figure 1B:
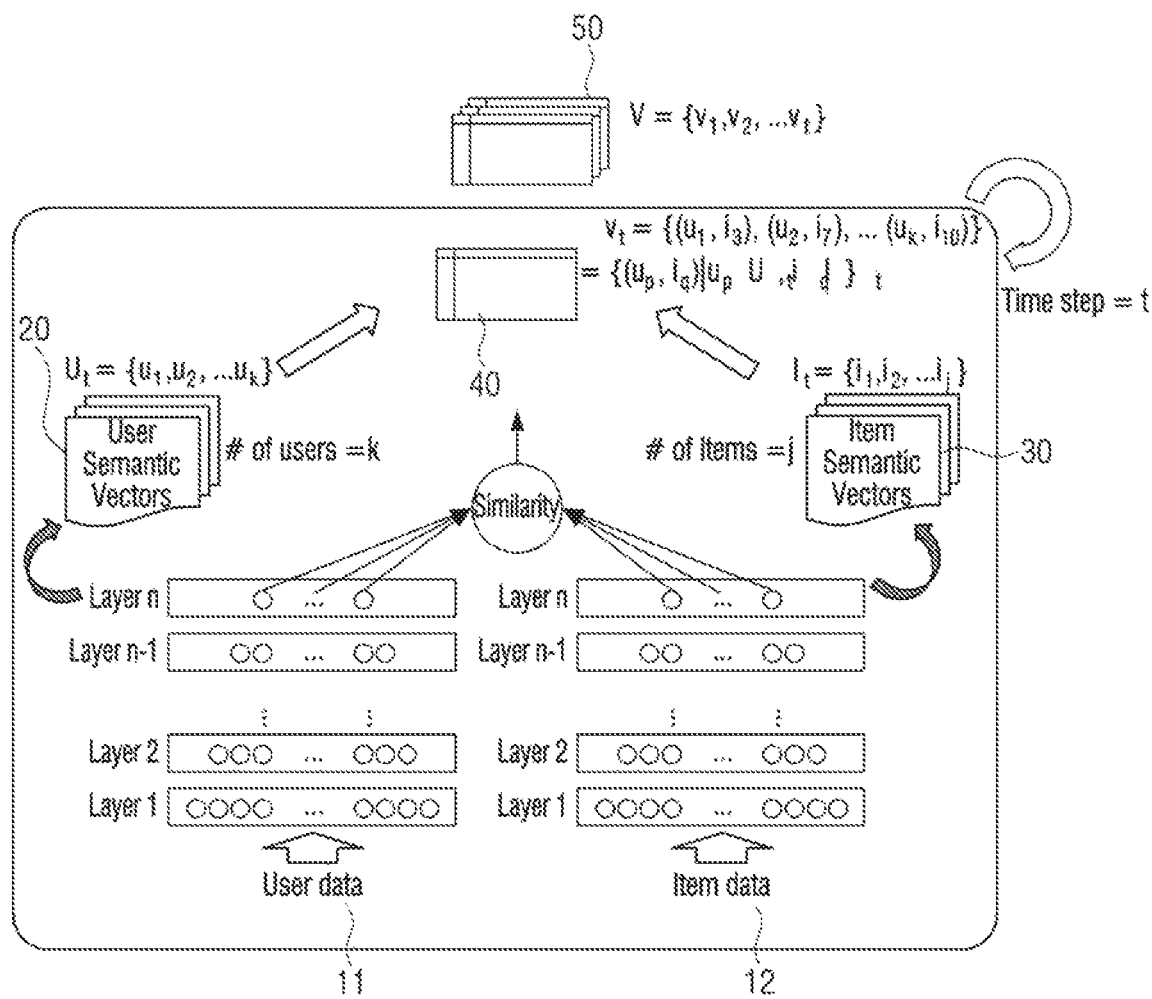
FIG. 1B is a view illustrating a process of generating a semantic vector for a user and an item using a deep structured semantic model (DSSM) according to an embodiment.

FIG. 1B is a view illustrating a process of generating a semantic vector for a user and an item using a deep structured semantic model (DSSM) according to an embodiment.

The electronic apparatus 100 may obtain data relating to the user and data relating to the item. The electronic apparatus 100 may generate a first semantic vector ($U_t$) 20 corresponding to t time, a second semantic vector ($I_t$) 30, and a vector ($V_t$) 40 indicating the relevance of the first semantic vector (20) and the second semantic vector (30) through a deep structured semantic model (DSSM) based on the obtained data. The DSSM is an artificial intelligence (AI) model that measures the relevance between a query and a document, and in the DSSM according to the disclosure, a query may correspond to a user and a document may correspond to an item. The DSSM model according to the disclosure may match an item associated with a particular user and represent the matching data in a form of a vector.

The electronic apparatus 100 may obtain the obtained specific user data 11 and at least one keyword for the particular item data 12, and enter the obtained keyword into the DSSM. The electronic apparatus 100 may remove unnecessary information from the user data 11 and the item data 12, extract only semantic information (e.g., words, etc.) to obtain a keyword. At least one keyword for the obtained user data 11 is input to the DSSM to generate the first semantic vector ($U_t$) 20 for a particular user, and at least one keyword for the obtained item data 12 is input to the DSSM to generate a second semantic vector ($I_t$) 30 for a particular item.

The electronic apparatus 100 may generate a vector $V_t$ 40 representing the relevance of a particular item and a particular user corresponding to the t time by calculating similarity between data output from layer n by inputting the keyword for the user data 11 to the DSSM and the data output from the layer n by inputting the keyword for the item data 12 to the DSSM. The vector $V_t$ 40 represents a vector representing a relevance between a particular user and a particular item corresponding to the t time, and referring to FIG. 1B, at t time, the first user $u_1$ is most relevant to the third item $i_3$ at t time, and the $k^{th}$ user $u_k$ has the highest relevance to the tenth item $i_{10}$ at t time. The electronic apparatus 100 may then repeat the above-described process at the first time interval to generate a vector (V) 50, that is a set of vectors that represent a relevance over time between a particular user and a particular item. The vector V 50 represents a set of vectors $v_1, v_2, \ldots v_t$ generated every first time interval.

According to an embodiment, the electronic apparatus 100, based on the user data and the item data obtained during the second time, may generate the first semantic vector ($U_t$) 20, the second semantic vector ($I_t$) 30, and the vector ($v_t$) 40 representing the relevance of the first semantic vector and the second semantic vector may be generated at a first time interval, and a change in relevance between a particular user and a particular item over time may be identified through the vector (V) 50 which is a set of vectors ($v_t$) 40 corresponding to the t time.

According to an embodiment, a user may be provided with an optimal recommendation item in consideration of temporal semantics.

Figure 2:
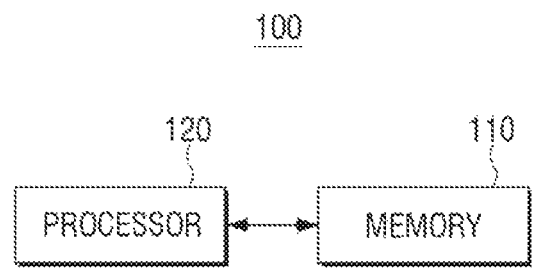
FIG. 2 is a block diagram illustrating a configuration of an electronic apparatus according to an embodiment.

FIG. 2 is a block diagram illustrating a configuration of the electronic apparatus 100, according to one embodiment. As illustrated in FIG. 2, the electronic apparatus 100 may include a memory 110 and a processor 120. The configurations shown in FIG. 2 are examples for implementing embodiments, and appropriate hardware/software configurations that would be apparent to those skilled in the art may be further included in the electronic apparatus 100. The electronic apparatus 100 may be implemented as a server or may be implemented as a server or a plurality of servers when implemented as a server.

The memory 110 may store a command or data related to at least one other elements of the electronic apparatus 100. The memory 110 may be implemented as a non-volatile memory, a volatile memory, a flash memory, a hard disk drive (HDD), a solid state drive (SSD), or the like. The memory 110 is accessed by the processor 120 and reading/writing/modifying/deleting/updating of data by the processor 120 may be performed. In the disclosure, the term memory may include the memory 110, read-only memory (ROM) in the processor 120, random access memory (RAM), or a memory card (for example, a micro SD card, and a memory stick) mounted to the electronic apparatus 100. The memory 110 may store a program for executing an AI agent. The AI agent is a personalized program to provide the electronic apparatus 100 with various services.

The memory 110 may store data corresponding to the first semantic vector and the second semantic vector generated through the DSSM, and the vector representing relevance of the first semantic vector and the second semantic vector, which will be described with reference to FIG. 4 below.

The functionality associated with AI in accordance with the disclosure operates via the processor 120 and the memory 110. The processor 120 may be implemented as a system on chip (SoC), a large scale integration (LSI), or a field programmable gate array (FPGA). The processor 120 may perform various functions by executing computer executable instructions stored in a memory to be described later. The processor 120 may be configured with one or a plurality of processors. At this time, one or a plurality of processors may be a general purpose processor, such as a central processing unit (CPU), an application processor (AP), or the like, a graphics-only processor such as graphics processing unit (GPU), visual processing unit (VPU), or the like, or an AI-dedicated processor such as neural network processing unit (NPU). The one or more processors control the processing of the input data according to a predefined operating rule or AI model stored in the memory 110. The predefined operating rule or AI model is made through learning. Here, that the AI model is made through learning may refer that the learning algorithm is applied to a plurality of learning data, so that a predefined operating rule or AI model of a desired characteristic is generated. The learning of the AI model may be performed in a device itself in which AI according to the disclosure is performed, and may be implemented through a separate server/system.

The processor 120 may obtain user data and item data by executing at least one command stored in the memory 110, generate a first semantic vector for each first time interval based on the user data, and generate the second semantic vector for each first time interval based on the item data. The processor 120 may generate the first semantic vector for each first time interval based on user data obtained during a second time interval greater than the first time interval reference, and generate the second semantic vector for each first time interval based on the item data obtained during the second time interval. The first time interval according to an embodiment may be preset according to a category of a particular item, and the user may directly set the first time interval. The processor 120 may obtain at least one keyword for the obtained user data and at least one keyword for item data, input at least one keyword for the user data to the DSSM to generate the first semantic vector, and input at least one keyword for the item data to the DSSM to generate the second semantic vector. The processor 120 may input at least one keyword for the obtained user data and item data to the DSSM to generate a vector representing the relevance of the first semantic vector and the second semantic vector.

The processor 120 may store the data corresponding to the vector representing the relevance, the first semantic vector, and the second semantic vector in the memory 110, and this will be described with reference to FIG. 4.

The processor 120 may learn a first AI model based on data corresponding to the vector representing the relevance, the first semantic vector, and the second semantic vector stored in the memory 110, to obtain or update a weight for the first AI model. The weight value is a virtual line connecting the nodes included in each layer of the AI model, and as the AI model is learned, a plurality of weights may be updated, and an operation of the layer may be performed through calculation of an updated plurality of weights and an operation result of a previous layer of the AI model.

The processor 120 may apply the obtained weight to a second AI model, obtain data for the user in real time, and input the first semantic vector generated through the DSSM to the second AI model based on the obtained user data to generate (output) the second semantic vector associated with the inputted first semantic vector. The generated second semantic vector may be a semantic vector for an item of interest to a particular user based on the particular user's data. The processor 120 may provide at least one recommendation item to the user based on the generated second semantic vector. The recommendation item provided to a user is provided on the basis of a second semantic vector, and a rank related to a preferred item based on the generated second semantic vector may be set, and the recommendation item may be provided to a user through the set ranking.

The processor 120 may apply the obtained weight to the second AI model, input a second semantic vector generated through the DSSM to the second AI model based on data related to the item updated in real time, and generate the first semantic vector related to the inputted second semantic vector. The generated first semantic vector may be a semantic vector associated with a user that may have an interest in the item related to the input second semantic vector. The processor 120 may provide at least one recommended user based on the generated first semantic vector. That is, based on the first semantic vector generated in the second AI model, the processor 120 can rank the user interested in the item, and at least one recommended user may be provided through the set ranking.

The processor 120 may update the weight of the first AI model based on the user's interaction with the recommended user and the recommendation item and the vector representing the relevance of the first semantic vector, the second semantic vector, and the first semantic vector and the second semantic vector. The processor 120 may apply the updated weight to the second AI model to learn an AI model that provides the recommendation item and the recommended user.

The first AI model and the second AI model according to an embodiment may be implemented as the deep Q networks (DQN) AI model. The DQN AI model using two Q networks AI model (Q network and target Q network) is used for reinforcement learning, and the AI model is learned by using data stored in a replay memory as input data and output data of the AI model. The reinforcement learning is a learning method for learning based on an AI model selecting an action according to an environment and changing a state by the action. As the environment changes in the reinforcement learning, the AI model obtains any compensation, and the goal of the reinforcement learning is to correct the action of the AI model toward a better reward. The data used for reinforcement learning may be composed of a set of state (S) data, action (A) data, reward data, and next state (state') data. The set of the data may be sequentially stored in the replay memory, and the memory 110 according to an embodiment may serve as a replay memory. Since there is no data related to learning in the memory 110 at the beginning of learning of the AI model according to the disclosure, some data sets may be first stored in the memory 110 to perform learning of the AI model.

The state, action, reward and next state data are data used for reinforcement learning of the AI model. The state data is data about a set of states that may occur in the current environment, and action data is data about a group of actions which the AI model may act according to the state data. The reward data is data related to the user's interaction corresponding to the action of the AI model, and is data related to the reward identified (or determined) according to the user's interaction corresponding to the action of the AI model. As an example, if the user reacts to the action of the AI model, the reward value may be high, and if the user ignores the action of the AI model, the reward value may be lowered. The next state data refers to data about a set of states for the newly created current environment based on reward for an action.

The enhanced learning AI model according to an embodiment may set the first semantic vector and the second semantic vector as state data and action data, and the detailed description thereof will be described with reference to FIGS. 3 through 4B.

Figure 3:
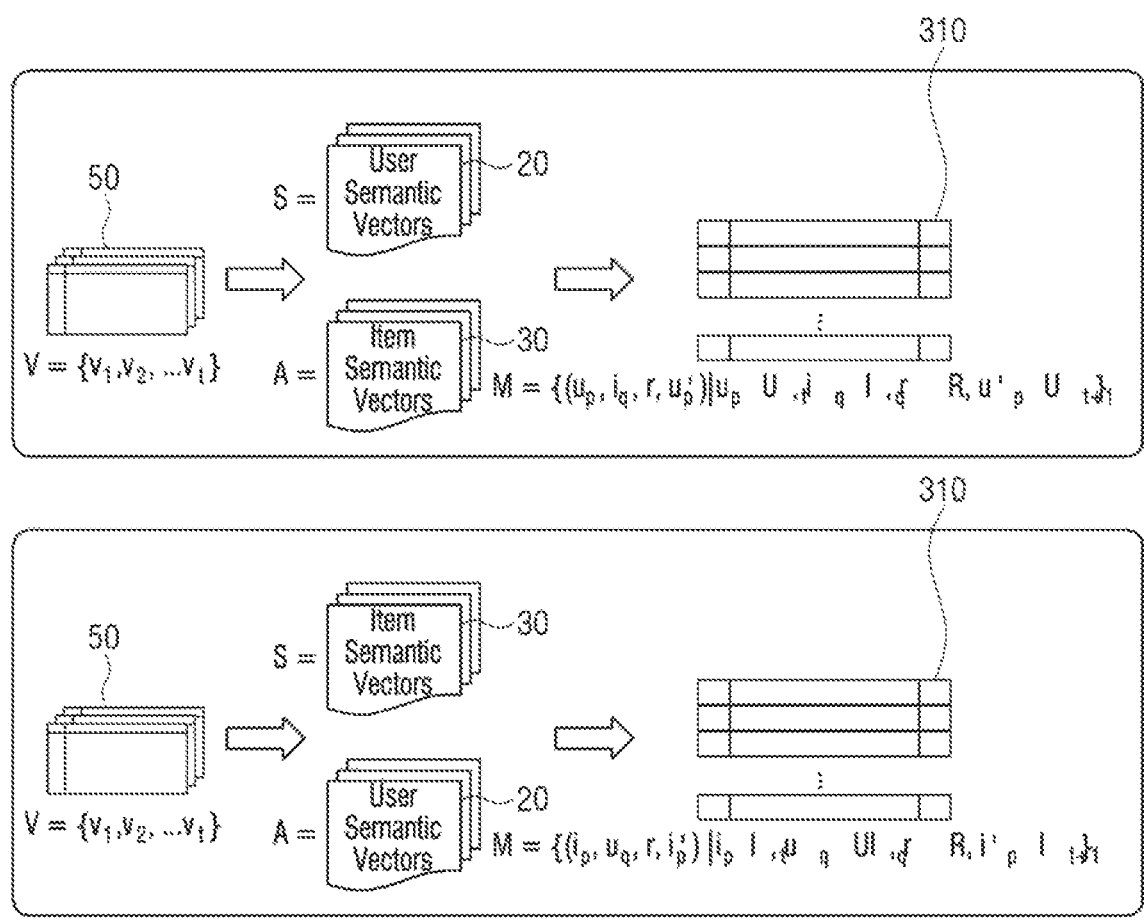
FIG. 3 is a view illustrating a process of storing a first semantic vector and a second semantic vector in a memory based on a set of vectors representing a relevance of the first semantic vector and the second semantic vector.

FIG. 3 is a view illustrating a process of storing a first semantic vector and a second semantic vector in a memory based on a set of vectors representing a relevance of the first semantic vector and the second semantic vector.

The electronic apparatus 100 may generate the first semantic vector and the second semantic vector for each first time interval, generate a vector representing the relevance of the first semantic vector and the second semantic vector, and store data corresponding to the generated vector, the first semantic vector, and the second semantic vector in a memory 310. The electronic apparatus 100 may map one of a first semantic vector 20 and a second semantic vector 30 among a set of vectors V 50 representing the relevance of the first semantic vector and the second semantic vector generated at each first interval with the state data S to obtain the state data S, and may obtain the action data A by mapping the other one of the first semantic vector 20 and the second semantic vector 30 among the set of vectors V 50 with the action data A to obtain the action data A. When the first semantic vector 20 is obtained as the state data S, the second semantic vector 30 may be obtained as the action data, and when the second semantic vector 30 is obtained as the state data S, the first semantic vector 20 may be obtained as action data.

That is, the electronic apparatus 100 may map the first semantic vector 20 for the user from the set of vectors V 50 to recommend the item having high relevance to a specific user ($u_p \in U_t$, and may set the action data by mapping ($i_q \in I_q$) the second semantic vector 30 for an item from a set of vectors V 50 as action data. The electronic apparatus 100 may map (obtain) the reward data for each action data A ($r \in R$), and connect (obtain) the next state data S'($U_p' \in U_{t+1}$). The electronic apparatus 100 may store the set ($u_p$, $i_q$, r, $U_p'$) of the next state data S', the state data S, action data A, reward data R and the next state data S' in the memory 310 M. That is, when the first semantic vector is obtained as the state data S', the data corresponding to the generated vector, the first semantic vector, and the second semantic vector may be data for the set ($u_p$, $i_q$, r, $U_p'$) described above.

Then, the electronic apparatus 100 may map the second semantic vector 30 for the item from the set of vectors V 50 to recommend the user who is highly related to a specific item ($i_p \in I_t$) to set the state data, and may map ($u_q \in U_q$) the first semantic vector 20 for the user from a set of vectors V 50 to set as the action data to be set as action data. The electronic apparatus 100 may map reward data for the action data A ($r \in R$) and connect the next state data S' ($i_p' \in I_{t+1}$). The electronic apparatus 100 may store the state ($i_p$, $u_q$, r, $i_p'$) of the state data S, the action data A, the reward data R and the next state data S' in the memory 310. That is, when the second semantic vector is obtained as the state data S, the data corresponding to the generated vector, the first semantic vector, and the data may be data related to the set ($i_p$, $u_q$, r, $i_p'$) described above.

Figure 4A:
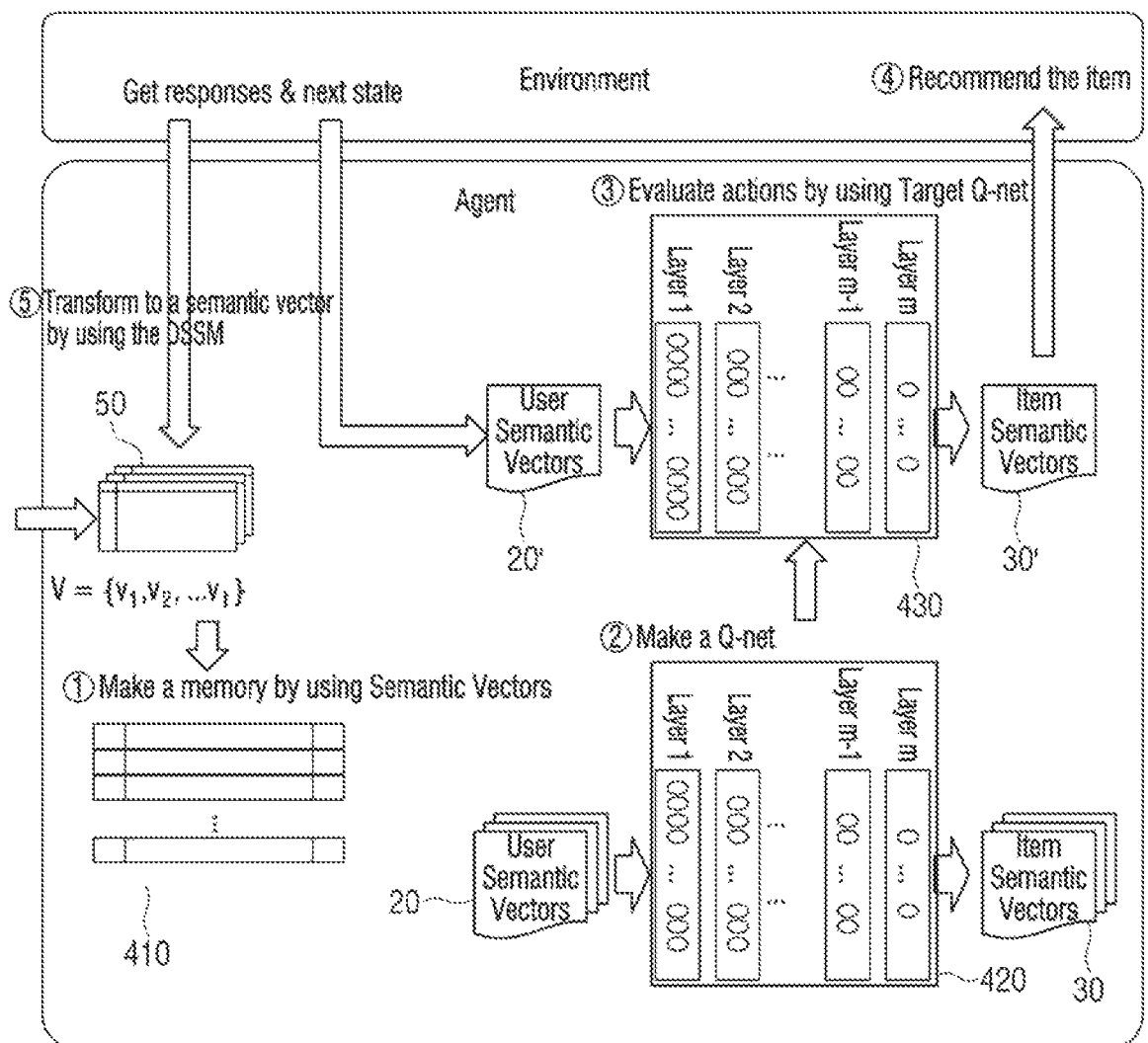
FIG. 4A is a view illustrating a method for providing a recommendation item through the first semantic vector according to an embodiment.

FIG. 4A is a diagram illustrating a method of providing a recommended item through first semantic vectors 20 and 20' according to an embodiment. FIG. 4A is a diagram illustrating a case where the Q network AI model is used as a first AI model 420 and the target Q network AI model is used as a second AI model 430. The target Q network AI model is an AI model having the same layer and layer structure as the Q network AI model. The weight obtained by learning from the Q network AI model may be applied to the target Q network AI model, and a recommended item may be provided to the user based on the output data from the target Q network AI.

The processor 120 may obtain user data and item data, and based on the obtained data, generate the first semantic vector 20, the second semantic vector 30, and the vector representing the relevance of the first semantic vector and the second semantic vector at each first time interval, and store the data corresponding to the generated vector in a memory 410 (①). The processor 120 may map the set of the state data, action data, reward data, and the next state data from the set V 50 of vectors representing the relevance of the first semantic vector and the second semantic vector generated each first interval and store the same in the memory 410.

The processor 120 may then learn the first AI model using the data set stored in the memory 410. Using the data set in which the first semantic vector 20 is stored as the state data and the second semantic vector 30 is stored as the action data in the memory 410, with the first semantic vector 20 as the input of the first AI model 420, and the second semantic vector 30 as the output of the first AI model 420, and based on the reward data and the next state data of the stored data set, the first AI model 420 may be learned, and the weight of the first AI model 420 as a result of learning may be obtained (②). The learning of the first AI model 420 may be conducted through the set of data stored in the memory 410, but may be conducted through only some data sets by a mini-batch.

The processor 120 may apply the obtained weight to the second AI model 430, obtain specific user data in real time, generate a first semantic vector 20' for a particular user based on the obtained user data, and input the generated first semantic vector 20' into the second AI model 430 to generate a second semantic vector 30' corresponding to the inputted first semantic vector 20' (③).

The processor 120 may provide at least one recommendation item based on the generated second semantic vector 30' (④). For example, items having high relevance to a particular user via the second semantic vector 30' may be ranked, and a recommendation item may be provided to the user in order of higher ranked items.

The processor 120 may newly generate the first semantic vector, the second semantic vector, and the vector for each first time interval using the DSSM based on the user's interaction with the recommended item and the newly obtained user data and item data, and store the corresponding data in the memory 110 (⑤).

The processor 110 may repeat the above-described processes (①~⑤) to learn the first AI model 420 and the second AI model 430, and may recommend an appropriate item to the user based on the learned AI model.

Figure 4B:
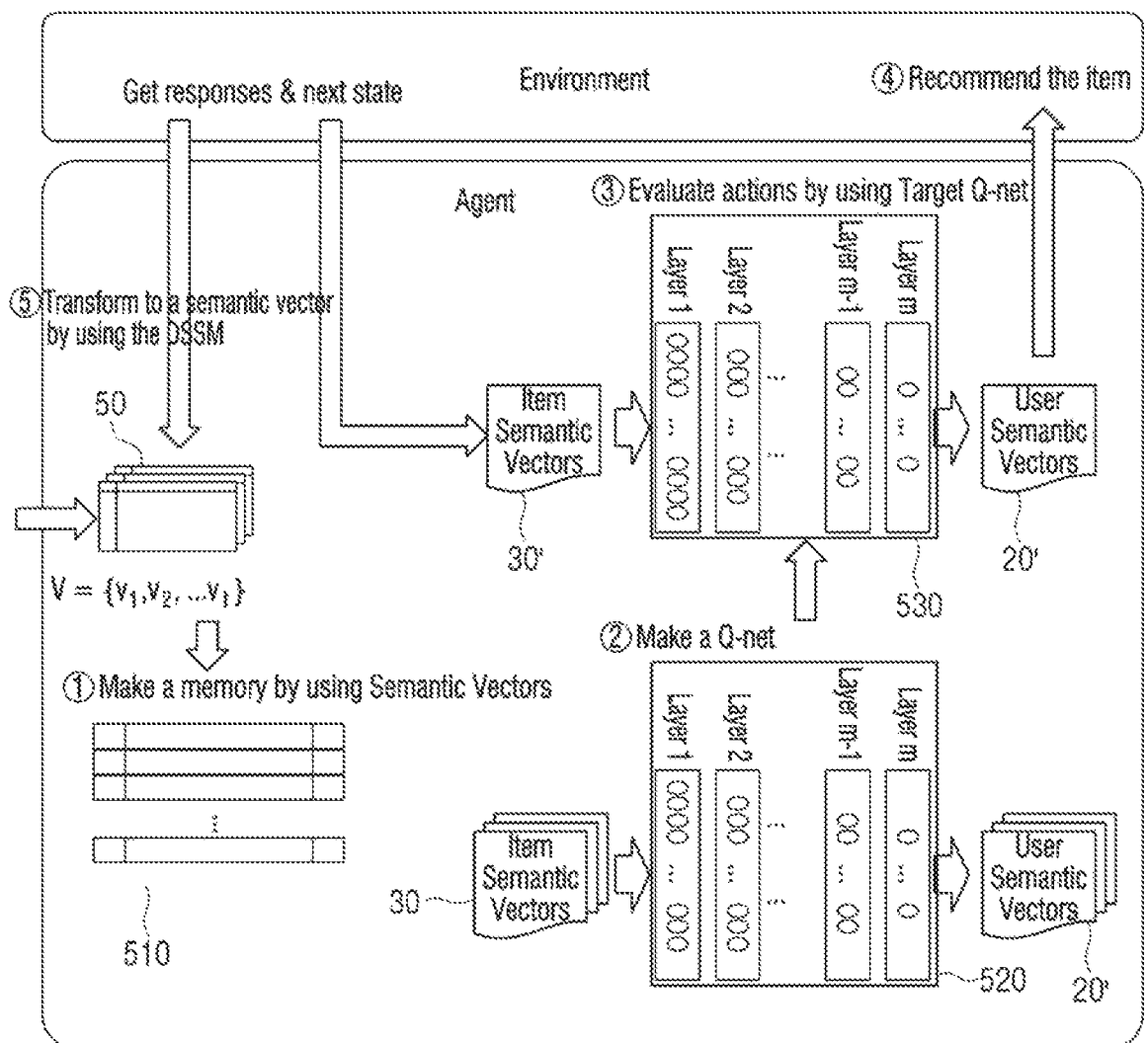
FIG. 4B is a view illustrating a method for providing a recommended user through the second semantic vector according to an embodiment.

FIG. 4B is a view illustrating a method for providing a recommended user through the second semantic vector 30, 30' according to an embodiment.

The processor 120 may obtain the user data and item data and generate a vector representing the relevance of the first semantic vector and the second semantic vector, the first semantic vector 20, the second semantic vector 30, and store the data corresponding to the generated vector in a memory 510 (①). The processor 110 may then learn a first AI model 520 using the data set stored in the memory 510. Using the data set in which the second semantic vector 30 is stored as the state data and the first semantic vector 20 is stored as the action data in the memory 510, with the second semantic vector 30 as the input of the first AI model 520, and the first semantic vector 20 as the output of the first AI model 520, and based on the reward data and the next state data of the stored data set, the first AI model 520 may be learned, and the weight of the first AI model 520 as a result of learning may be obtained as a result of learning (②).

The processor 120 may apply the obtained weight to the second AI model 530, obtain data about a specific item in real time to generate a second semantic vector 30' for the item based on the obtained item data, and generate a first semantic vector 20' corresponding to the inputted second semantic vector 30' by inputting the second semantic vector 30' to the second AI model 530 (③).

The processor 120 may recommend a specific item to a recommended user having a high degree of relevance to a specific item based on the generated first semantic vector 20' (④). For example, through the generated first semantic vector 20', a ranking of the user with high relevance with the item related to the second semantic vector 30' may be set, and an item related to the second semantic vector 30' may be recommended to at least one user having a higher ranking.

The processor 120 may generate the first semantic vector, the second semantic vector, and the vector for each first time interval using the DSSM based on the interaction of the recommended user with respect to the item recommendation and the data related to the newly obtained user data and the item, and store the corresponding data in the memory 110 (⑤).

The processor 120 may repeat the above-described processes (①~⑤) to learn the first AI model 520 and the second AI model 530, and may obtain a recommended user corresponding to a specific item based on the learned AI model.

Figure 5:
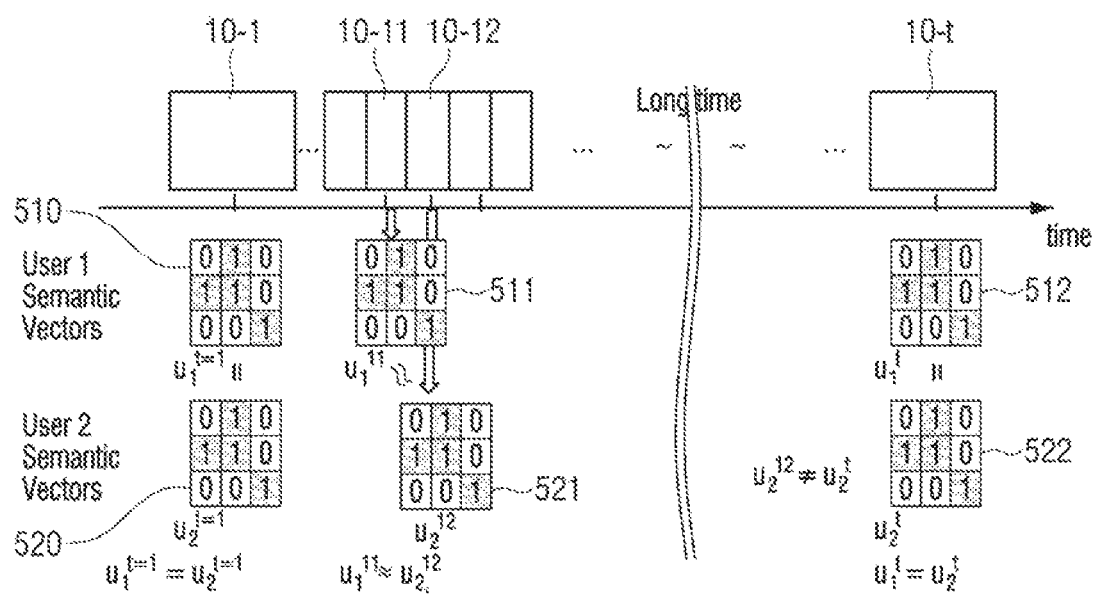
FIG. 5 is a view illustrating a user semantic vector according to temporal flow.

FIG. 5 is a view illustrating a user semantic vector according to temporal flow.

According to an embodiment, the processor 120 may generate first semantic vectors 510 to 522 for each first time interval. When the first user (User 1) and the second user (User 2) perform the same action at the first time (t=1), the semantic vector $u_1^{t=1}$ (510) at the first time of the first user generated through the user data 10-1 corresponding to the first time and the semantic vector $u_2^{t=1}$ (520) at the first time of the second user are the same ($u_1^{t=1}=u_2^{t=1}$), and the same semantic vector represents that there is the same semantics in the generated time. Afterwards, when the first user's first semantic vector $u_1^{11}$ (511) is generated based on the user data 10-11 corresponding to the eleventh time by the first user performing some action at the eleventh time, and the first semantic vector of the second user $u_2^{12}$ (521) based on the user data 10-12 corresponding to the twelfth time is generated by the second user performing the same action as the first user at the twelfth hour close to the eleventh hour, since the two first semantic vectors are generated in close time, they may have similar meanings $u_1^{11} \approx u_2^{12}$. At the t time at which long time has passed, the first user and the second user may have the same act as the eleventh time, and the first semantic vector $u_1^t$ (512) of the first user and the first semantic vector $u_2^t$ (522) of the second user may be generated based on the user data 10-t corresponding to the t time. In this case, since the first semantic vector $u_2^{12}$ (521) of the second user generated at the twelfth time and the first semantic vector $u_2^t$ (522) of the second user generated at the t time are not generated at the close time, they have different semantics $u_2^{12} \neq u_2^t$. That is, according to an embodiment, the first semantic vectors may have different semantics depending on which time the user has made the same behavior. Since the first semantic vector is generated based only on the user data obtained during the second time, the old user data and the item data are not gradually considered in the semantic vector over time. The processor 120 may generate the first semantic vector for each first time interval based on user data obtained during a second time interval greater than the first time interval reference, and generate a second semantic vector for each first time interval based on data relating to the item obtained during the second time interval. Accordingly, the recently generated semantic vector is generated based on recent user data and item data, and it may be determined by the processor 120 whether the semantic vector recently generated by controlling the second time interval is included up to which amount of past information.

Figure 6:
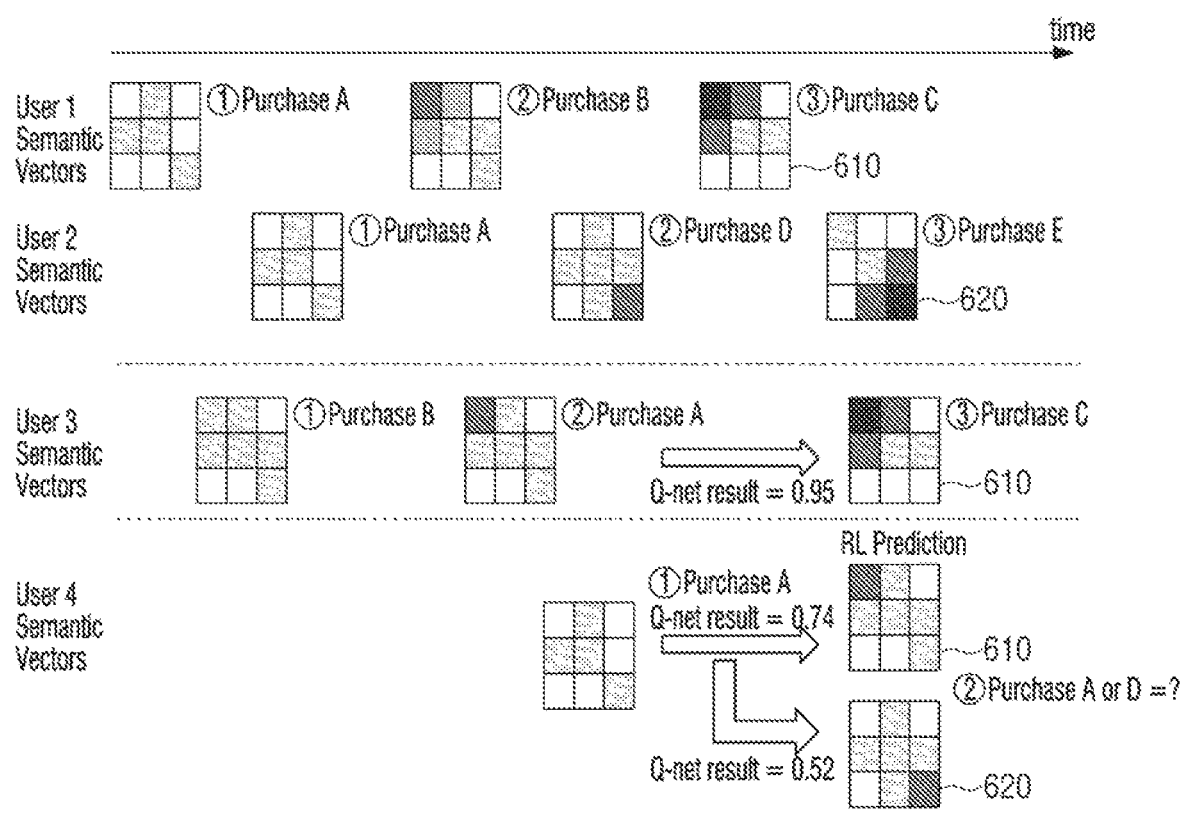
FIG. 6 is a view illustrating a method for determining a behavior pattern of users based on user data over time.

FIG. 6 is a view illustrating a method for determining a behavior pattern of users based on user data over time.

According to an embodiment, a first user (user 1) purchases an item A, and then purchases a B item and a C item to generate the first semantic vector, such as a current pattern 1 610. That is, in the case of the first user, the A, B, and C items are sequentially purchased over time, and thus the pattern 1 610 in which the right upper element is enhanced is shown. In addition, in the case of the second user, the pattern 2 620, in which the left sub-element is enhanced, appears by sequentially purchasing the A, D, and E items over time.

The processor 120 may learn the first and second AI models according to the disclosure based on the first semantic vector of the first user, the first semantic vector of the second user, and predict a pattern of the third user and the fourth user based on the learned AI model. That is, if the third user purchases an item of B and A, the processor 120 may predict 610 that the third user will purchase the C item next with a probability of 95% and recommend the C item to the third user. If the fourth user purchases only the A item, the processor 120 may predict 610 that the fourth user is to purchase the A item with a 74% probability, and predict 620 that the fourth user will purchase the next D item with a 52% probability, and recommend the item according to the prediction to the fourth user.

Figure 7:
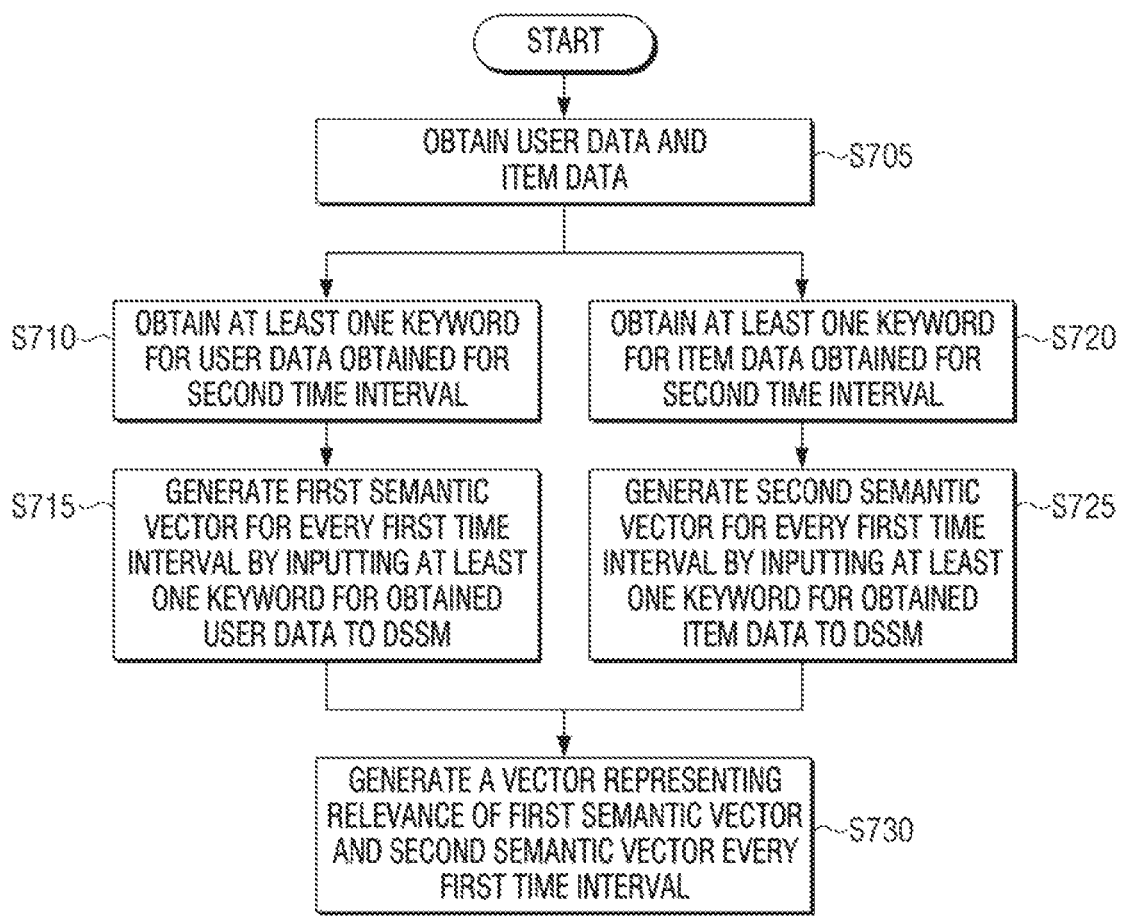
FIG. 7 is a flowchart illustrating a method for generating a first semantic vector, a second semantic vector, and a relevance of the first semantic vector and the second semantic vector according to an embodiment.

FIG. 7 is a flowchart illustrating a method for generating a first semantic vector, a second semantic vector, and a relevance of the first semantic vector and the second semantic vector according to an embodiment.

The electronic apparatus 100 may obtain user data and item data in operation S705. The electronic apparatus 100 may obtain at least one keyword for the user data obtained during the second time interval in operation S710. The electronic apparatus 100 may remove unnecessary information from the user data, and extract only information (e.g., words, etc.) having semantics, to obtain a keyword. The electronic apparatus 100 may generate the first semantic vector for each first time interval by inputting a keyword for the obtained user data to the DSSM in operation S715. Specifically, by inputting the keyword for user data to a first layer (Layer 1) of the DSSM, the first semantic vector may be generated based on the output value of the nth layer. The electronic apparatus 100 may obtain at least one keyword for the item data obtained during the second time interval in operation S720. The electronic apparatus 100 may remove unnecessary information from the item data, and extract only information (e.g., words, etc.) having semantics, to obtain a keyword. The electronic apparatus 100 may generate a second semantic vector for each first time interval by inputting a keyword for the obtained item data to the DSSM in operation S725. Specifically, a keyword for item data is input to a first layer (Layer 1) of the DSSM, and a second semantic vector may be generated based on the output value of the $n^{th}$ layer (layer n). The electronic apparatus 100 may generate a vector representing the relevance of the first semantic vector and the second semantic vector for each first time interval based on the output value of the $n^{th}$ layer of the DSSM in operation S730. As described above, the first semantic vector is a semantic vector related to the user data, and the second semantic vector may be an item semantic vector related to the item data.

The electronic apparatus 100 may repeat the above processes and generate a set of vectors representing the first semantic vector and the second semantic vector at each first time interval.

Figure 8:
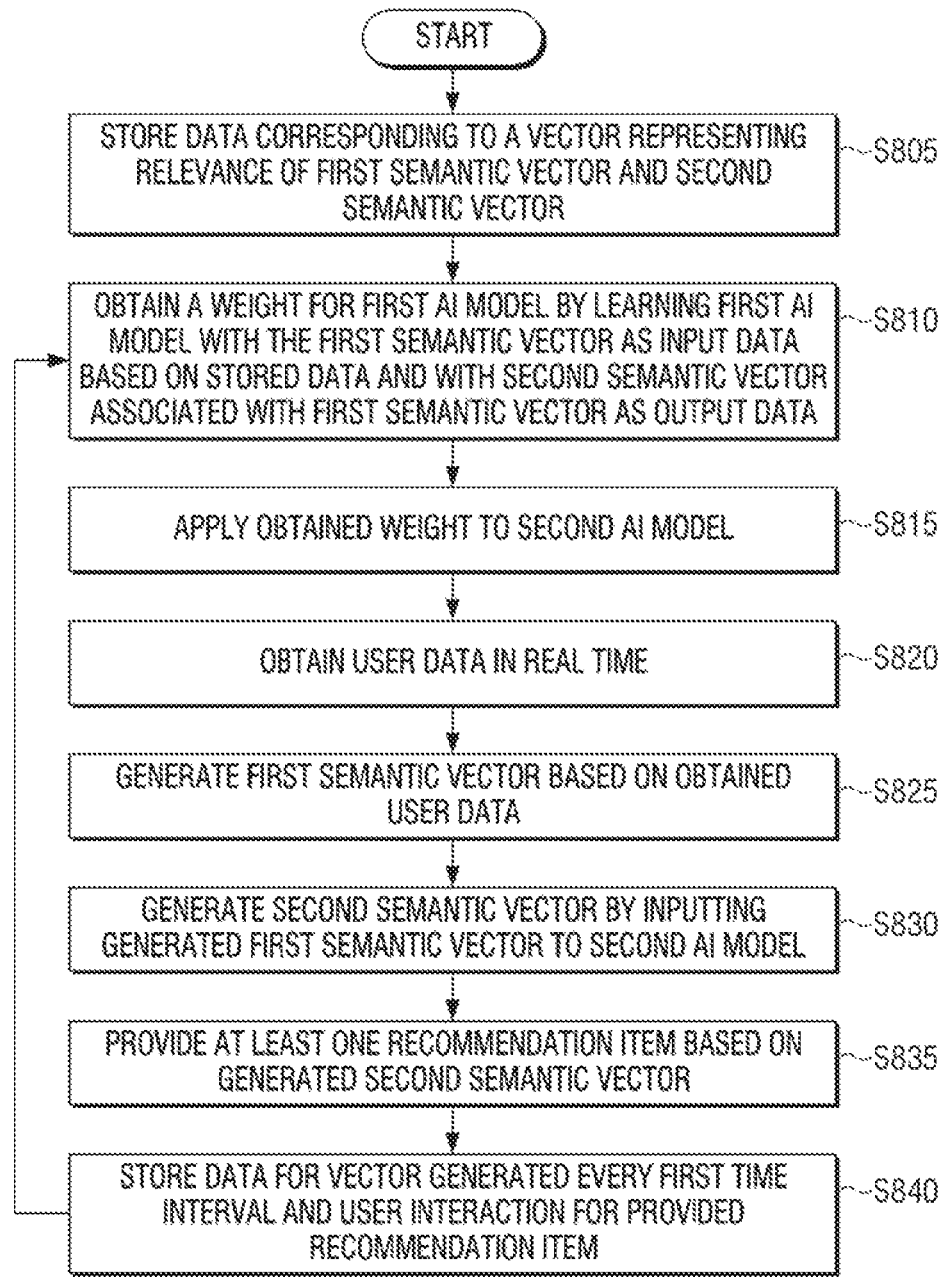
FIG. 8 is a flowchart illustrating a method for obtaining a recommendation item according to an embodiment.

FIG. 8 is a flowchart illustrating a method for obtaining a recommendation item according to an embodiment.

The electronic apparatus 100 may store data corresponding to a vector representing the relevance of the first semantic vector and the second semantic vector in operation S805. The set of the state data, the action data, the compensation data, and the next state data may be stored on the basis of a set of vectors representing the relevance of the first semantic vector and the second semantic vector for each first time interval. The electronic apparatus 100 may obtain a weight for the first AI model by learning the first AI model by using the first semantic vector as input data based on the stored data set and the second semantic vector related to the first semantic vector as output data in operation S810. The first AI model may be learned by using the first semantic vector as the state data and the second semantic vector associated with the first semantic vector as action data to learn the first AI model, and the weight of the first AI model may be obtained as a result of learning. The electronic apparatus 100 may apply a weight for the obtained first AI model to the second AI model in operation S815. The user data may be obtained in real time in operation S820, and the first semantic vector may be generated based on the obtained user data in operation S825. At least one keyword may be obtained based on the obtained user data, and the obtained keyword may be input to the DSSM to generate a first semantic vector. The electronic apparatus 100 may generate the second semantic vector by inputting the generated first semantic vector to the second AI model in operation S830. The electronic apparatus 100 may generate the second semantic vector for an item related to the user by inputting the first semantic vector for the user into the second AI model. The electronic apparatus 100 may provide at least one recommended item based on the generated second semantic vector in operation S835. The provided recommendation item may be a recommendation item highly related to a user related to the first semantic vector input to the second AI model. The electronic apparatus 100 may store data relating to the user's interaction with the provided recommendation item and the vector V generated for each first interval in operation S840. Specifically, the user's interaction may be whether to purchase a given recommendation item, or the like. The electronic apparatus 100 may learn the first AI model by using the second semantic vector as input data based on the data stored in operation S840, and may obtain the weight for the first AI model by learning the first AI model in operation S810. The electronic apparatus 100 may continue to learn the first AI model based on the user's interaction and data on the newly generated vector V, to update the weight, and apply the updated weight to the second AI model to provide a recommendation item to a user. As described above, the first AI model may be a Q network AI model, and the second AI model may be a target Q network AI model.

Figure 9:
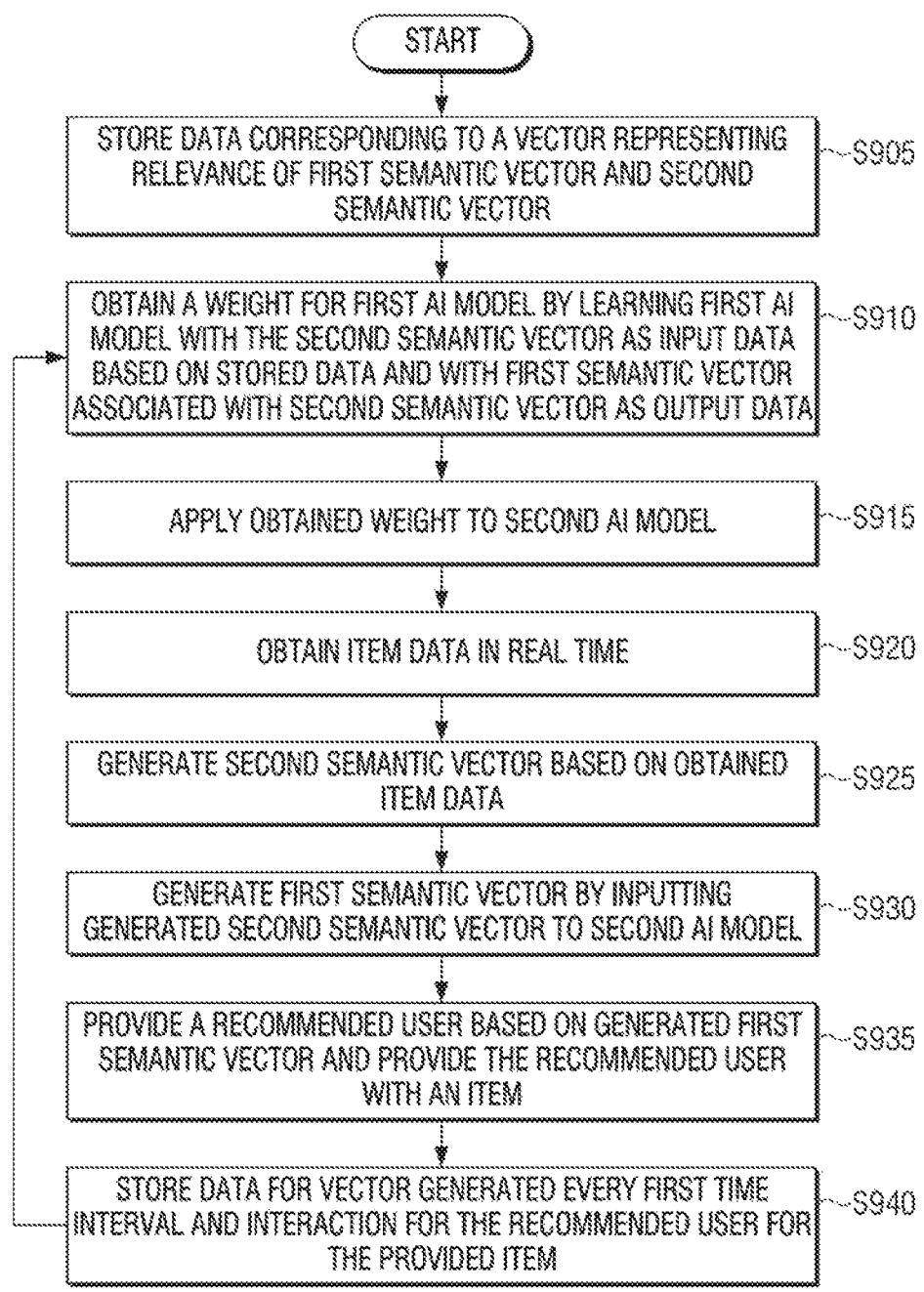
FIG. 9 is a flowchart illustrating a method for obtaining a recommended user according to an embodiment.

FIG. 9 is a flowchart illustrating a method for obtaining a recommended user according to an embodiment.

The electronic apparatus 100 may store data corresponding to a vector representing the relevance of the first semantic vector and the second semantic vector in operation S905. The state of state data, the action data, the reward data, and the next state data may be stored on the basis of a set of vectors representing the relevance of the first semantic vector and the second semantic vector for each first time interval. The electronic apparatus 100 may obtain a weight for the first AI model by learning the first AI model by using the second semantic vector as input data based on the stored data set and the first semantic vector related to the second semantic vector as output data in operation S910. The first AI model may be learned by using the second semantic vector as the state data and the first semantic vector associated with the second semantic vector as action data to learn the first AI model, and the weight of the first AI model may be obtained as a result of learning. The electronic apparatus 100 may apply the obtained weight for the first AI model to the second AI model in operation S915. The item data may be obtained in real time in operation S920, and a second semantic vector may be generated based on the obtained item data in operation S925. At least one keyword may be obtained based on the obtained item data, and the second semantic vector may be generated by inputting the obtained keyword to the DSSM. The electronic apparatus 100 may generate the first semantic vector by inputting the generated second semantic vector to the second AI model in operation S930. The electronic apparatus 100 may enter a second semantic vector for the user into the second AI model to generate a first semantic vector for an item associated with the user. The electronic apparatus 100 may provide at least one recommended user based on the generated first semantic vector and provide the item to the recommended user in operation S935. That is, an item corresponding to the item data used as input to the second AI model may be provided to the recommended user. In operation S940, the electronic apparatus 100 may store data relating to the provided interaction of the recommended user and the vector V generated at each first interval in operation S940. Specifically, the user's interaction may be whether to purchase the item provided to the recommended user, or the like. The electronic apparatus 100 may learn the first AI model by using the first semantic vector as input data and the second semantic vector relating to the first semantic vector as the output data based on the data stored in step S940, and may obtain the weight for the first AI model by learning the first AI model in operation S910. The electronic apparatus 100 may continuously learn the first AI model based on the interaction of the recommended user and the data for the newly generated vector, update the weight, apply the updated weight to the second AI model, provide the recommended user related to the item, and provide the corresponding item to the recommended user.

Figure 10:
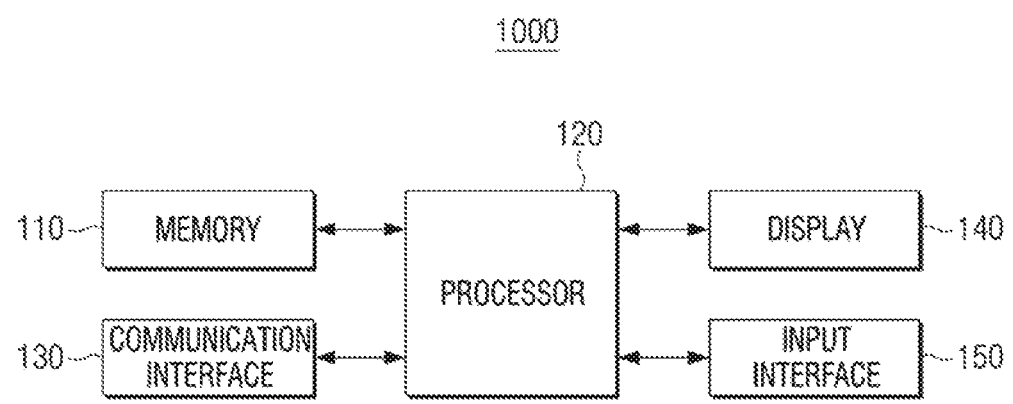
FIG. 10 is a block diagram illustrating a specific configuration of an electronic apparatus according to an embodiment.

FIG. 10 is a block diagram illustrating a specific configuration of an electronic apparatus according to an embodiment.

Referring to FIG. 10, an electronic apparatus 1000 may include the memory 110, the processor 120, the communication interface 130, the display 140, and an input interface 150.

Among the configurations of FIG. 10, the parts overlapping with FIG. 2 will not be further described.

The communication interface 130 is configured to communicate with various types of external devices according to various types of communication methods. The communication intrerface 130 may include a Wi-Fi chip, a Bluetooth chip, a wireless communication chip, a near field communication (NFC) chip, and the like. The processor 120 performs communication with various external devices using the communication interface 130. When the Wi-Fi chip or the Bluetooth chip is used, various connection information such as a service set identifier (SSID) and a session key may be transmitted and received first, and communication information may be used to transmit and receive various information. The wireless communication chip refers to a chip that performs communication according to various communication standards such as IEEE, Zigbee, 3rd Generation (3G), Third Generation Partnership Project (3GPP), Long Term Evolution (LTE), or the like. NFC chip means a chip operating in NFC using, for example, a 13.56 MHz band among various RF-ID frequency bands such as 135 kHz, 13.56 MHz, 433 MHz, 860 to 960 MHz, 2.45 GHz, or the like.

The communication interface 130 may communicate with an external device and a server, and may obtain user data and item data from an external device or a server. That is, according to an embodiment, the electronic apparatus 1000 may collect and obtain user data and item data directly, but the embodiment is not limited thereto, and the electronic apparatus 1000 may obtain user data and item data from an external device or a server through the communicator 130.

According to an embodiment, the electronic apparatus 1000 may generate a vector that indicates the relevance of the first semantic vector, the second semantic vector, and the first semantic vector and the second semantic vector through the DSSM. The electronic apparatus 1000 may provide the recommendation item or the recommended user directly using the first AI model and the second AI model based on the generated vector. However, the embodiment is not limited thereto, and the electronic apparatus 1000 may transmit vectors generated by the electronic apparatus 1000 to an external server having the first AI model and the second AI model through the communication interface 130, and receive and provide the recommendation item and the recommended user from an external server.

The display 140 may display an advertisement screen for displaying a recommendation item generated by the processor 120 to a specific user, and an advertisement screen for displaying a specific item to the recommended user. The display 140 may display an advertisement screen for providing a recommendation item to a specific user based on the first semantic vector outputted by inputting the first semantic vector to the second AI model, and may display the recommended user based on the first semantic vector outputted by inputting the second semantic vector to the second AI model. The display 140 may be implemented as, but is not limited to, a liquid crystal display (LCD) device, an organic light emitting diode (OLED) display, a plasma display panel (PDP), and the like.

The input interface 150 may receive the user's interaction. The processor 120 may receive the user's interaction with respect to the recommended user and the recommendation item displayed through the display 140, and the processor 120 may obtain a compensation value for the action of the second AI model based on the user's interaction. For example, if the recommendation item is displayed on the display 140 in the form of an advertisement and the user may select and purchase the displayed recommendation item, the processor 120 may receive an interaction of selecting or purchasing an item by the user via the input interface 150, and determine a reward value (recommendation item selection and purchase) for the action (recommendation item) based on the received interaction. When the user purchases the recommendation item, the reward value may be set to +, and if the user ignores the recommendation item without purchasing the recommendation item, the reward value may be set to −. However, the processor 120 may determine the reward value with the number ranging from 0 to 10, and in this example, the processor 120 may determine the compensation value to be high when the user purchases the recommended item, and if the recommendation item is ignored, the processor 120 may determine the reward value to be low.

Various embodiments of the disclosure may be implemented in software, including instructions stored on machine-readable storage media readable by a machine (e.g., a computer). An apparatus may call instructions from the storage medium, and execute the called instruction, including an electronic apparatus (e.g., electronic apparatus A) according to the disclosed embodiments. When the instructions are executed by a processor, the processor may perform a function corresponding to the instructions directly or by using other components under the control of the processor. The instructions may include code generated by a compiler or a code executable by an interpreter. A machine-readable storage medium may be provided in the form of a non-transitory storage medium. Herein, the term "non-transitory" denotes that a storage medium does not include a signal but is tangible, and does not distinguish the case in which a data is semi-permanently stored in a storage medium from the case in which a data is temporarily stored in a storage medium.

According to embodiments, a method disclosed herein may be provided in software of a computer program product. A computer program product may be traded between a seller and a purchaser as a commodity. A computer program product may be distributed in the form of a machine readable storage medium (e.g., CD-ROM) or distributed online through an application store (e.g., PlayStore™). In the case of on-line distribution, at least a portion of the computer program product software may be stored temporarily or at least temporarily in a storage medium such as a manufacturer's server, a server in an application store, or a memory in a relay server.

Further, each of the components (e.g., modules or programs) according to the above-described various embodiments may be composed of one or a plurality of entities, and some subcomponents of the above-mentioned subcomponents may be omitted, or other subcomponents may be further included in various embodiments. Alternatively or additionally, some components (e.g., modules or programs) may be integrated into one entity to perform the same or similar functions performed by each respective component prior to integration. Operations performed by a module, program, or other component, in accordance with various embodiments, may be performed sequentially, in a parallel, repetitive, or heuristically manner, or at least some operations may be performed in a different order, omitted, or other operations may be added.

Hereinabove, although the embodiments of the disclosure have been shown and described, it should be understood that the disclosure is not limited to the disclosed embodiments and may be variously modified without departing from the spirit and the scope of the disclosure. Therefore, the modifications should not be understood separately from the technical spirit or scope of the disclosure.

What is claimed is:

1. A controlling method of an electronic apparatus for training an artificial intelligence (AI) model configured to provide information identifying a recommendation item and a recommended user, the method comprising:
   obtaining first user data and first item data at a first time interval;
   obtaining at least one first keyword for the first user data and at least one second keyword for the first item data;
   generating a first semantic vector at a second time interval by inputting at least one keyword for the first user data to a deep structured semantic model (DSSM);
   generating a second semantic vector at the second time interval by inputting at least one keyword for the first item data to the DSSM;
   generating a first vector that represents a relevance between the first semantic vector and the second semantic vector at the second time interval;
   storing data corresponding to the generated first vector, the first semantic vector, and the second semantic vector;
   obtaining an updated weight for a first AI model by training the first AI model based on the stored data;
   applying the updated weight to a second AI model;
   providing the information identifying the recommendation item or the recommended user based on the second AI model; and
   re-updating the updated weight of the first AI model based on a user interaction of user,
   wherein providing the information identifying the recommendation item or the recommended user based on the second AI model comprises:
      obtaining at least one among second user data and second item data in real time;
      based on the second user data being obtained in real time, obtaining at least one third keyword for the second user data;
      generating a third semantic vector by inputting the at least one third keyword for the second user data to the DSSM;
      generating a fourth semantic vector by inputting the third semantic vector to the second AI model;
      providing the information identifying the recommendation item based on the fourth semantic vector through a display of the electronic apparatus;
      receiving the user interaction of user corresponding to the second user data associated with the recommendation item through an input interface of the electronic apparatus;
      generating a second vector that represents a relevance between the third semantic vector and the fourth semantic vector;
      based on the second item data being obtained in real time, obtaining at least one fourth keyword for the second item data;
      generating a fifth semantic vector by inputting the at least one fourth keyword for the second item data to the DSSM;
      generating a sixth semantic vector by inputting the fifth semantic vector to the second AI model;
      providing the information identifying the recommended user based on the sixth semantic vector through the display of the electronic apparatus;
      providing the recommended user with information of the recommendation item corresponding to the fifth semantic vector through the display of the electronic apparatus;

receiving the user interaction of the recommended user associated with the recommendation item through the input interface of the electronic apparatus; and generating a third vector that represents a relevance between the fifth semantic vector and the sixth semantic vector, wherein the re-updating the updated weight of the first AI model based on the user interaction comprises:

re-updating the updated weight of the first AI model based on the user interaction of user corresponding to the second user data, the third semantic vector, the fourth semantic vector, and the second vector; and re-updating the updated weight of the first AI model based on the user interaction of the recommended user, the fifth semantic vector, the sixth semantic vector, and the third vector, wherein the providing the information identifying the recommendation item comprises displaying an advertising content of the recommendation item through the display of the electronic apparatus, wherein the providing the information identifying the recommended user comprises displaying a list of the recommended user through the display of the electronic apparatus, wherein the providing the recommended user with information of the recommendation item comprises displaying an advertising content of the recommendation item corresponding to the fifth semantic vector through the display of the electronic apparatus, wherein the re-updating the updated weight of the first AI model comprises training the first AI model by performing a reinforcement learning based on state data, action data and reward data, and obtaining the re-updated weight for the first AI model, wherein the state data comprises the third semantic vector and the fifth semantic vector, the action data comprises the fourth semantic vector and the sixth semantic vector, and the reward data comprises the user interaction of user corresponding to the second user data and the user interaction of the recommended user, wherein the first time interval is greater than the second time interval, and wherein the first time interval is predetermined according to a category of the item.

2. The method of claim 1, wherein the first AI model is a Q network AI model, and the second AI model is a target Q network model.

3. An electronic apparatus for training an artificial intelligence (AI) model configured to provide information identifying a recommendation item and a recommended user, the electronic apparatus comprising:

a display;

an input interface;

a memory configured to store at least one instruction; and a processor configured to execute the at least one instruction to:

obtain user data and item data at a first time interval, obtain at least one first keyword for the user data and at least one second keyword for the item data, generate a first semantic vector at a second time interval based on the user data by inputting at least one keyword for the user data to a deep structured semantic model (DSSM), generate a second semantic vector at the second time interval based on the item data by inputting at least one keyword for the item data to the DSSM, generate a first vector representing a relevance of the first semantic vector and the second semantic vector at the second time interval, store data corresponding to a first generated vector, the first semantic vector, and the second semantic vector in the memory, obtain a updated weight for a first AI model, by training a first artificial intelligence (AI) model based on the data stored in the memory, apply the updated weight to a second artificial intelligence (AI) model, provide the information identifying the recommendation item or the recommended user based on a second AI model; and re-update the updated weight of the first AI model based on a user interaction of user, wherein the processor is further configured to:

obtain at least one among second user data and second item data in real time, based on the second user data being obtained in real time, obtain at least one third keyword for the second user data, generate a third semantic vector by inputting the at least one third keyword for the second user data to the DSSM, obtain a fourth semantic vector by inputting the third semantic vector to the second AI model, provide the information identifying the recommendation item based on the fourth semantic vector through the display, receive the user interaction of user corresponding to the second user data associated with the recommendation item through the input interface, generate a second vector that represents a relevance between the third semantic vector and the fourth semantic vector, re-update the updated weight of the first AI model based on the user interaction of user corresponding to the second user data, the third semantic vector, the fourth semantic vector, and the second vector, based on the second item data being obtained in real time, obtain at least one fourth keyword for the second item data;

generate a fifth semantic vector by inputting the at least one fourth keyword for the second item data to the DSSM;

obtain a sixth semantic vector by inputting the fifth semantic vector to the second AI model;

provide the information identifying the recommended user based on the sixth semantic vector through the display;

provide the recommended user with information of the recommendation item corresponding to the fifth semantic vector through the display;

receive the user interaction of the recommended user associated with the recommendation item through the input interface of the electronic apparatus; and generate a third vector that represents a relevance between the fifth semantic vector and the sixth semantic vector; and re-updating the updated weight of the first AI model based on the user interaction of the recommended user, the fifth semantic vector, the sixth semantic vector, and the third vector;

wherein the processor is further configured to:

display an advertising content of the recommendation item, a list of the recommended user and an advertising content of the recommendation item corresponding to the fifth semantic vector through the display,
wherein the processor is further configured to:
re-update the updated weight of the first AI model by performing a reinforcement learning based on a state data, a action data and a reward data, and obtain the re-updated weight for the first AI model,
wherein the state data comprises the third semantic vector and the fifth semantic vector, the action data comprises the fourth semantic vector and the sixth semantic vector, and the reward data comprises the user interaction of user corresponding to the second user data and the user interaction of the recommended user,
wherein the first time interval is greater than the second time interval, and
wherein the first time interval is predetermined according to a category of the item.

4. The electronic apparatus of claim 3, wherein the first AI model is a Q network AI model, and the second AI model is a target Q network model.

* * * * *